April 16, 1957 — O. J. HILL — 2,788,729
CULTIVATOR
Filed Sept. 28, 1953 — 2 Sheets-Sheet 1

Orville J. Hill
INVENTOR.

April 16, 1957  O. J. HILL  2,788,729
CULTIVATOR
Filed Sept. 28, 1953  2 Sheets-Sheet 2
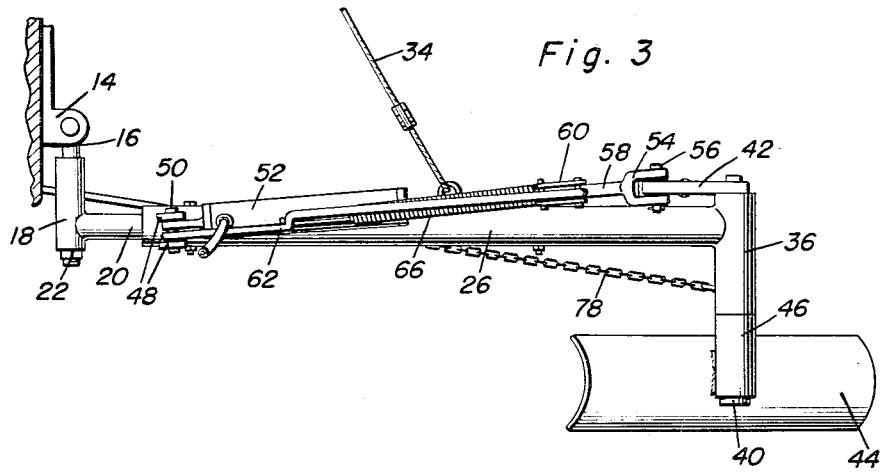
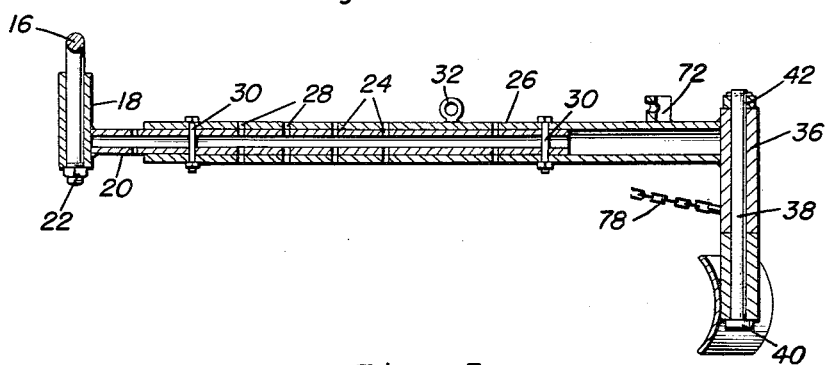
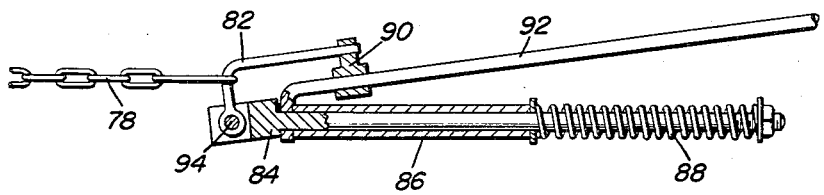
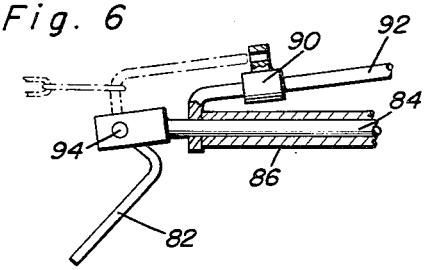
Orville J. Hill
INVENTOR.

United States Patent Office 2,788,729
Patented Apr. 16, 1957

2,788,729

CULTIVATOR

Orville J. Hill, Ree Heights, S. Dak.

Application September 28, 1953, Serial No. 382,618

4 Claims. (Cl. 97—47.38)

This invention relates to a cultivator, and more specifically provides a cultivator attachment for tractors having a hydraulic pump for supplying a working fluid to the tractor attachment.

An object of this invention is to provide a cultivator for removing weeds from rows on intertilled crops and especially in rows of trees in a shelter belt.

Another object of this invention is to provide a cultivator having a hydraulically controlled cultivating blade.

A further object of this invention is to provide a cultivator where the blade is adjustable to move in and out in the row of trees or other obstructions.

Yet another object of this invention is to provide a cultivator having automatic release means upon the striking of an obstruction by the cutlivator blade.

A still further object of this invention is to provide a cultivator having a spring for automatically returning the blade to a predetermined position.

An important object of this invention is to provide a cultivator which may be used in removing weeds from between various obstructions such as trees, fence posts, or vineyard posts.

A further important object of this invention is to provide a cultivator attachment for tractors which is simple in construction, easy to manipulate, easy to attach to the tractor and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse view taken substantially along the line 3—3 of Figure 1;

Figure 4 is a longitudinal, vertical section taken substantially along section line 4—4 of Figure 2 showing the structural details of the cultivator mounting bracket;

Figure 5 is a detail, vertical section taken substantially along section line 5—5 of Figure 1 showing details of the cultivator release means in its normal position; and Figure 6 is a detail section similar to Figure 5 showing the automatic release means in its released position.

Figure 2:
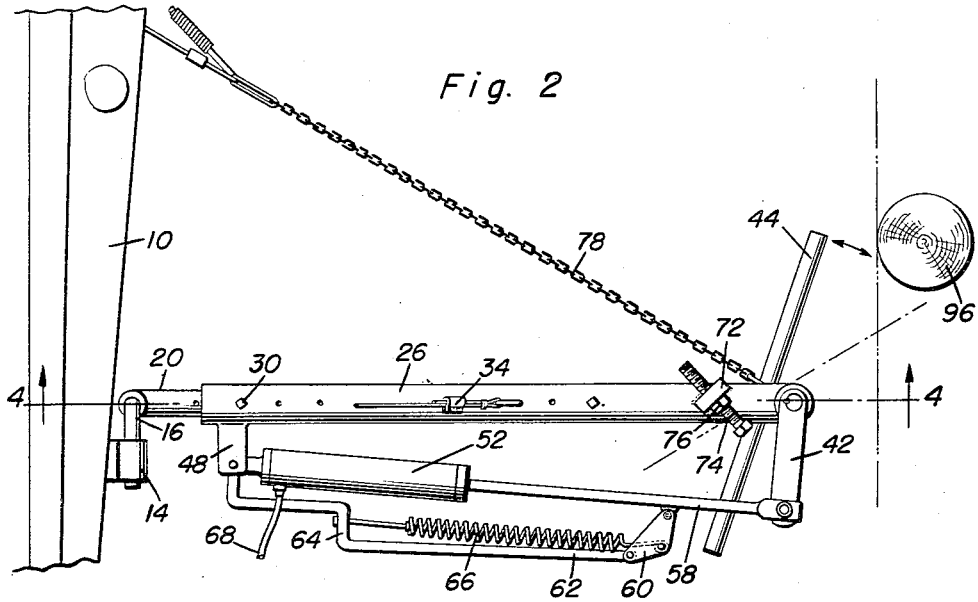
Figure 2 is a top plan view showing the structural details of the cultivator attachment.
Figure 1:
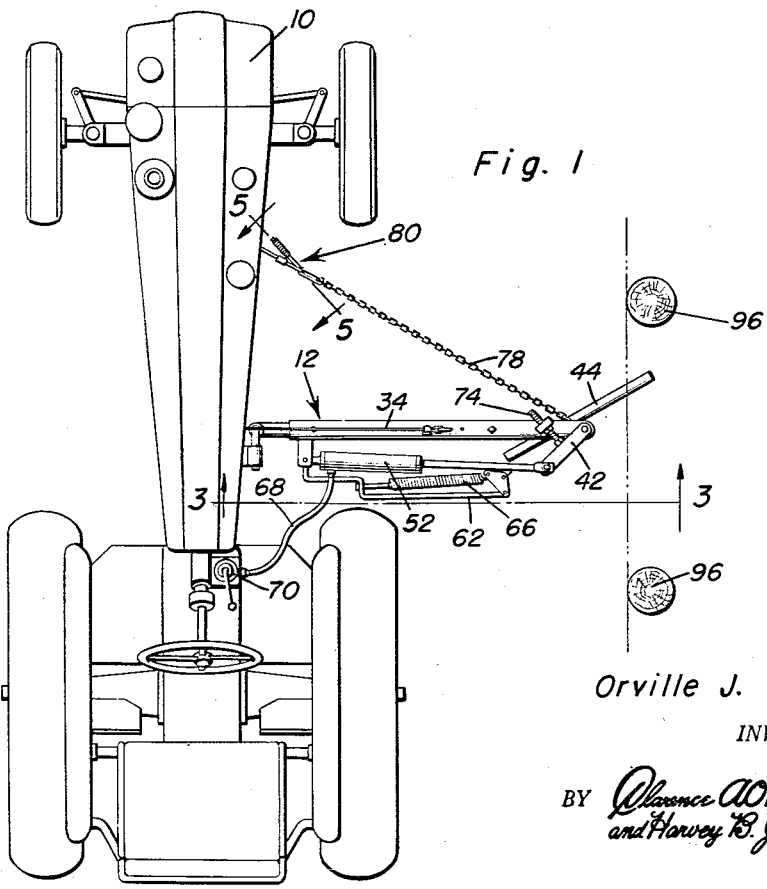
Figure 1 is a top plan view of the cultivator of this invention attached to the side of a tractor with the cultivator blade extending between adjacent trees.

Referring now more specifically to the drawings in detail, it will be seen that the numeral 10 generally designates a tractor having a cultivator attachment 12 secured thereto along one side thereof in front of the rear wheel wherein a tractor driver may observe the cultivator attachment 12 while the tractor is in operation.

Referring now more specifically to Figures 2-6 it will be seen that the cultivator 12 is attached to the tractor 10 by the use of a bracket 14 having a horizontal bore therein for receiving a right angular rod 16. A tubular member 18 having a tubular projection 20 on one side thereof is secured to the right angular member 16 by suitable nuts 22 threaded on the lower portion of the right angular member 16. The tubular extension 20 is provided with a plurality of aligned apertures 24 and a second tubular extension 26 slidably surrounds the member 20 and the member 26 is provided with spaced apertures 28 for selective registry with the apertures 24 and a pair of bolts 30 are passed through registered apertures 24 and 28 thereby securing the projecting members 20 and 26 in telescopic adjusted relation. An eye member 32 is secured to the upper surface of the tubular member 26 and a cable 34 is connected thereto at one end and connected to the tractor 10 at its other end directly above the bracket member 14 thereby holding the tubular members 20 and 26 in angular adjusted relation. Rigidly secured to the outer end of the tubular member 26 is a second tubular member 36 at right angles to the member 26 and having a vertical bore therein. Pivotally secured in the vertical tubular member 36 is a rod member 38 having a fitted flange 40 at one end and a link member 42 at its opposite end for rotation of the rod member 38. A cultivator blade 44 having a tubular mounting member 46 is secured to the rod 38 for rotation therewith. It will be noted that the cultivator blade 44 is generally elongated and having a concave surface facing the direction of movement of the tractor 10.

Now referring specifically to Figures 2 and 3, it will be seen that a pair of lugs 48 are secured to and project outwardly from the rear edge of the inner end of the tubular member 26 and a pin 50 is removably inserted in suitable apertures at the outer ends of the lugs 48. A hydraulic cylinder and piston arrangement 52 has one end pivotally attached to the pin 50 and its other end pivotally attached to the link member 42 by suitable U-shaped member 54 and pin 56. Adjacent the midpoint of the piston rod 58 is secured a pair of triangular members 60 which are pivotally attached to the piston rod at one end of the base and pivotally attached to an elongated rod 62 at its other base end and the rod 62 is pivotally attached to the pin member 50 between the lugs 48. The elongated rod 62 has an offset bend portion 64 and a tension spring 66 is secured to the offset bend portion and the apex of the triangular member 60 wherein the coil spring 66 tends to work against the action of the piston and cylinder 52 when the hydraulic line 68 is under pressure from the hydraulic pump 70 on the tractor 10. An upstanding lug 72 having a suitable threaded aperture receives a stop bolt 74 having a lock nut 76 thereon and the head of the bolt 74 is in the path of movement of the link 42 wherein the outward movement of the cultivator blade 44 is limited. Secured to the tubular member 36 is a chain 78 connected to the front portion of the tractor 10 and having an automatically releasing means 80 wherein the attachment 12 will pivot about the right angle member 16 if the blade 44 hits an obstruction. As best seen in Figures 5 and 6, the chain 78 is secured to a right angular hook member 82 which is pivotally attached to a sliding member 84 which is slidably received in a sleeve member 86 and a compression spring 88 surrounds the remote end of the sliding member 84 and abuts the end of the sleeve 86 thereby holding the sliding member in operative position. The free end of the right angle hook 82 is slidably received in a bracket 90 which is attached to a mounting rod 92 secured to the tractor frame 10. As pressure is applied to the chain 78, the sliding member 84 will be moved outwardly from the sleeve 86 against the pressure of the sleeve 86 against the pressure of the spring 88 permitting the hook member 82 to become disengaged from the bracket 90 and pivot about its pivot axis 94 and disengage from the chain 78 in a manner as set down in Figure 6.

The operation of the device will be readily understood. With the tractor operator in position on the tractor and moving in a horizontal direction with the cultivator blade 44 between adjacent trees or fence posts 96 the hydraulic pump valve may be manipulated to extend the piston and cylinder arrangement 62 thereby pivoting the link 42, the rod 38 and the blade 44 about the vertical axis of the rod 38 thereby missing the tree directly in front of the blade. As the pressure is released the tension spring 66 immediately returns the piston rod 58 and the cultivator blade 44 to operative position. If the blade 44 strikes some obstruction, the tension on the chain 78 will cause the spring 88 to compress thereby disengaging the right angle hook member 82 from the bracket 90 permitting the chain 78 to become disengaged and the cultivator attachment 12 swung about the vertical pivot formed by the member 16. Obviously, cable 34 may be adjusted to raise or lower the blade 44 and the blade 44 may be laterally extended by adjusting the tubular members 20 and 26. Obviously, the members 60, 62 and 64 may be omitted and the spring 66 connected, by suitable eyes, to the members 26 and 42 thereby pivoting the link 42. The device may be made of any readily obtainable material which meets the specifications of this device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A cultivator comprising a bracket adapted to be attached to a tractor, a telescopically adjustable tubular arm projecting laterally of said bracket and universally pivotally connected thereto, a depending tubular member at the outer end said arm, a rod rotatably positioned in said tubular member, a cultivator blade secured to the lower end of said rod, an offset arm attached to the upper end of said rod, and means interconnecting the end of said offset arm and the arm for rotatably adjusting said blade about said rod.

2. The structure as defined in claim 1 wherein said supporting member includes telescopic portions for adjusting said blade laterally, said interconnecting means including a fluid actuated piston and cylinder arrangement for moving said blade in one direction, and a tension coil spring urging the blade in the other direction, said spring being disposed substantially parallel to said piston and cylinder arrangement wherein the line of force of the spring will be substantially parallel to the piston and cylinder arrangement.

3. The structure as defined in claim 1 wherein said supporting member includes telescopic portions for adjusting said blade laterally, said interconnecting means including a fluid actuated piston and cylinder arrangement for moving said blade in one direction, and a tension coil spring urging the blade in the other direction, said spring being disposed substantially parallel to said piston and cylinder arrangement wherein the line of force of the spring will be substantially parallel to the piston and cylinder arrangement, means for supporting the arm in a vertical position, and means for maintaining the arm in a horizontal position with the last named means being releasable upon impact of the blade with a stationary object thereby permitting rearward swinging movement of said arm for preventing damage to the blade.

4. A cultivator comprising a supporting member adapted to be attached to a tractor, a cultivator blade pivotally attached to said supporting member, actuating means for pivoting said blade in one direction about the pivotal connection between the blade and supporting member, spring means for urging the blade in the other direction about the pivotal connection, means connected to said supporting member for maintaining the supporting member and blade in adjusted vertical position, and strain release means adapted to interconnect the tractor and support member to permit rearward swinging movement of the supporting member and blade upon contact of the blade with an obstruction.

References Cited in the file of this patent

UNITED STATES PATENTS

| 2,442,095 | Reed et al. | May 25, 1948 |
| 2,442,198 | Dawley | May 25, 1948 |
| 2,504,686 | Hilblom | Apr. 18, 1950 |
| 2,521,549 | Smith | Sept. 5, 1950 |
| 2,608,146 | Lund | Aug. 26, 1952 |
| 2,611,309 | Crain | Sept. 23, 1952 |
| 2,656,777 | Mohn et al. | Oct. 27, 1953 |

FOREIGN PATENTS

| 801,644 | France | May 23, 1936 |